(12) United States Patent
Smith et al.

(10) Patent No.: US 12,008,096 B2
(45) Date of Patent: *Jun. 11, 2024

(54) SECURE AUTHENTICATION

(71) Applicant: Capital One Services, LLC, McLean, VA (US)

(72) Inventors: Emily Smith, Washington, DC (US); Erik Neighbour, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,044

(22) Filed: Jul. 11, 2023

(65) Prior Publication Data

US 2023/0351001 A1    Nov. 2, 2023

Related U.S. Application Data

(63) Continuation of application No. 17/368,965, filed on Jul. 7, 2021, now Pat. No. 11,709,924.

(51) Int. Cl.
G06F 21/30 (2013.01)
G06F 21/35 (2013.01)
H04L 9/40 (2022.01)
H04W 12/033 (2021.01)

(52) U.S. Cl.
CPC ............ *G06F 21/35* (2013.01); *H04L 63/102* (2013.01); *H04W 12/033* (2021.01); *G06F 2221/2111* (2013.01)

(58) Field of Classification Search
CPC ............ G06F 21/35; G06F 2221/2111; H04L 63/102; H04L 63/083; H04L 63/18; H04L 63/0853; H04W 12/033
See application file for complete search history.

(56) References Cited

U.S. PATENT DOCUMENTS

| | | | |
|---|---|---|---|
| 9,075,979 B1 * | 7/2015 | Queru | .................... H04W 64/00 |
| 2016/0156609 A1 * | 6/2016 | Grigg | ...................... H04L 63/08 |
| | | | 726/7 |
| 2019/0332787 A1 * | 10/2019 | Graf | ........................ G06F 16/95 |

* cited by examiner

*Primary Examiner* — Izunna Okeke
(74) *Attorney, Agent, or Firm* — Perkins Coie LLP

(57) ABSTRACT

Methods and systems are disclosed herein for authenticating a user. A security device may use an object associated with a user and a device of the user to authenticate the user, for example, if the user has forgotten a password. A user may insert the object (e.g., a card, or other object) into the security device and may select an option to authenticate via a device that is trusted by both the security device and the user, rather than authenticating by entering a password at the security device.

20 Claims, 5 Drawing Sheets

SECURE AUTHENTICATION

CROSS-REFERENCE TO RELATED APPLICATION(S)

This application is a continuation of U.S. patent application Ser. No. 17/368,965, filed Jul. 7, 2021. The content of the foregoing application is incorporated herein in its entirety by reference.

BACKGROUND

User authentication has been historically implemented using a username and a password. When a user wanted to access a computer system, the computer system would prompt the user to enter a username and a password. If the user entered the information correctly, the user would be allowed to access the computer system. Recently the use of computers has expanded as more people have started to use computers for more and more activities, thus accessing more and more systems. Generally, computing systems require a username and a password. Thus, the more systems the user accesses, the higher the number of usernames and passwords the user has to remember. For example, if a user access twenty different systems for twenty different activities, the user may need to remember 20 usernames and 20 passwords. Furthermore, the user needs to be able to remember which set of username and password is needed for which system. Some systems try to solve this problem by storing the users' usernames and passwords in an electronic storage and when a user needs to use the stored username and password, the user can retrieve those credentials. However, there are a number of issues with this approach. First, every time a user changes a password, the user has to update the electronic storage. Also, the user must carry the electronic storage everywhere passwords may be needed and if lost, the user may lose all that information.

SUMMARY

To address these and other issues, a security device may enable a user to authenticate using a user's device without having to supply a password. A user may insert the object (e.g., a card, or other object) into the security device and may select an option to authenticate via a device that is trusted by both the security device and the user, rather than authenticating by entering a password at the security device.

A security device may determine that an object has been inserted into the security device. The object may identify a profile associated with a user that inserted the object into the security device. The profile may indicate devices (e.g., devices that are trusted by the user and/or the security device) that may be used to authenticate the user with the security device. For example, the security device may be a smart locker that may be unlocked with a card indicating a user profile and a password associated with the user profile. To eliminate a need for a password, the smart locker may communicate with a server and/or a device of the user to authenticate the user and grant access to items and/or information stored by the smart locker. The security device may determine devices that are associated with the user profile and may generate for display a list of the devices. For example, the smart locker may determine that a user profile associated with the card indicates a mobile phone and a laptop are trusted by the user. The security device may receive a selection of a user device from the list of the one or more devices. For example, the smart locker may display the list of devices on a screen of the smart locker and may receive a selection of the mobile phone from the user. The security device may send a first access code to the user device (e.g., directly or via broadcast into an environment surrounding the security device). For example, the smart locker may broadcast a first access code in a room in which the smart locker is located and the mobile phone may receive the broadcasted access code. By broadcasting the first access code in an environment surrounding the security device, the security device may ensure that the user is located close to the security device (e.g., to make it more difficult for attackers to break into the security device).

The security device may send an identification of the selected device (e.g., the user device) and a command to a server. The command may cause the server to send a notification to the user device. The notification may include a field for entering the first access code so that the first access code may be sent to the server. For example, the smart locker may send the device ID of the mobile phone to a server and the server may send a notification or other message to the mobile phone via the Internet. The user device may send the access code received from the security device to the server, for example, in response to the notification. The server may send the access code received from the user device to the security device. For example, the mobile phone may send the access code received from the smart locker to a server associated with the smart locker via an application that is trusted by the server. The server may verify that the access code is received from the same user device that was indicated by the device ID received from the security device. For example, the smart locker may be able to authenticate the user because the access code it sent to the mobile phone matches the access code received from the server. In response to determining that the first access code (e.g., the access code sent to the user device) matches the second access code (e.g., the access code received from the server), the security device may grant access to information and/or items accessible via the security device. For example, the smart locker may grant access to contents of the smart locker and/or information associated with the user's account/user profile associated with the smart locker.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
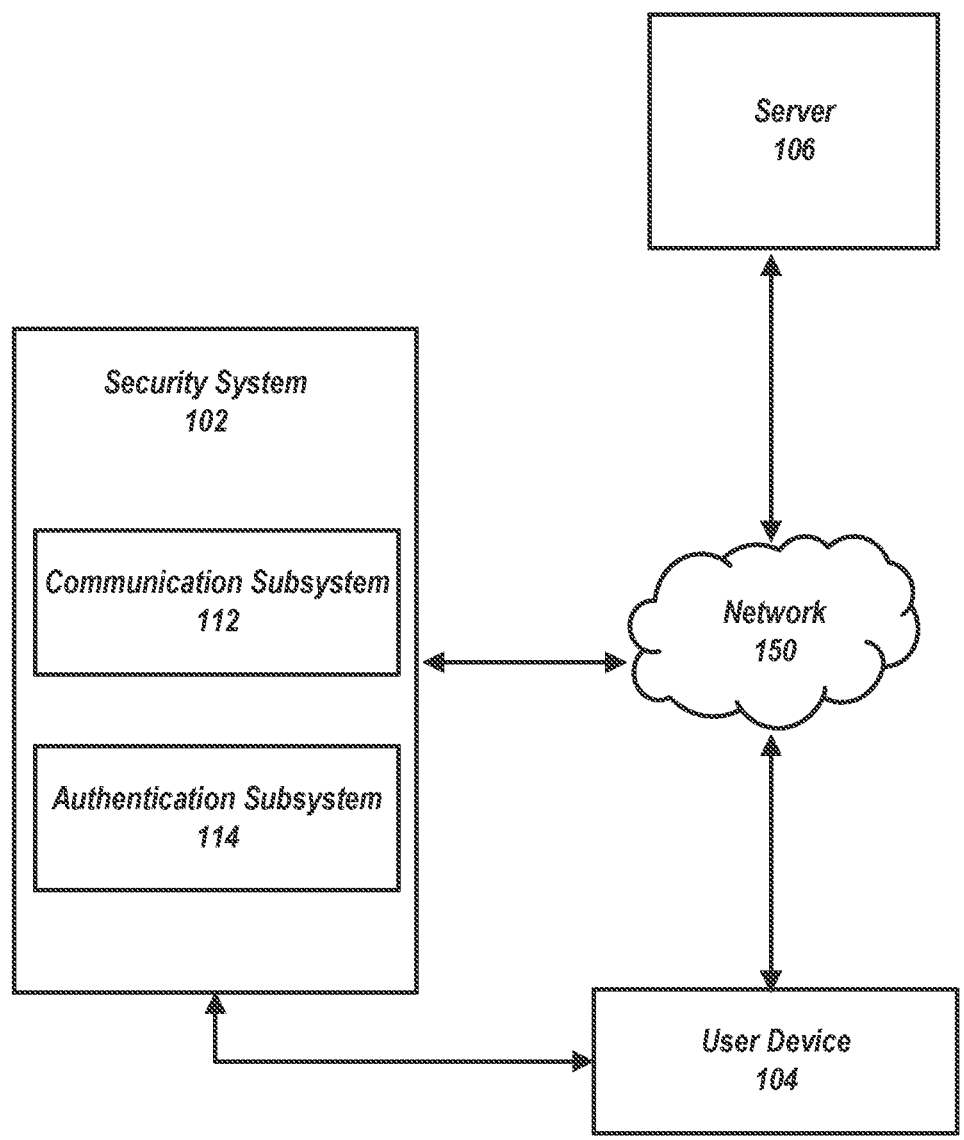
FIG. 1 shows an example computing system for authenticating a user, in accordance with some embodiments.

FIG. 1 shows an example computing system 100 for authenticating a user, for example, even if the user forgets a password or pin number or to eliminate the need for a password/pin number. The security system 102 may determine that an object has been inserted into the security system 102 (e.g., via a card slot or other object scanner). The object may identify a profile or account associated with a user. The profile may indicate devices (e.g., devices that are trusted by the user and/or the security device) that may be used to authenticate the user with the security device. For example, the security device may be a smart home security system that may be disarmed with an object (e.g., a card, a chip that implements radio-frequency identification (RFID), etc.) that indicates a user profile and a password associated with the user profile. If the user forgets the password, the smart home security system may be able to communicate with a server and/or a device of the user to authenticate the user and grant access to items and/or information stored by the smart home security system. The security device may determine devices that are associated with the user profile and may generate for display a list of the devices. For example, the smart home security system may determine that a user profile associated with the card indicates a mobile phone and a laptop are trusted by the user. The security device may receive a selection of a user device from the list of the one or more devices. For example, the smart home security system may display the list of devices on a screen of the smart home security system and may receive a selection of the mobile phone from the user. The security device may send a first access code to the user device (e.g., directly or via broadcast into an environment surrounding the security device). For example, the smart home security system may broadcast a first access code in a room in which at least a portion of the smart home security system is located and the mobile phone may receive the broadcasted access code. By broadcasting the first access code in an environment surrounding the security device, the security device may ensure that the user is located close to the security device (e.g., to make it more difficult for attackers to break into the security device).

The security device may send an identification of the selected device (e.g., the user device) and a command to a server. The command may cause the server to send a notification to the user device. The notification may include a field for entering the first access code so that the first access code may be sent to the server. For example, the smart home security system may send the device ID of the mobile phone to a server and the server may send a notification or other message to the mobile phone via the Internet. The user device may send the access code received from the security device to the server, for example, in response to the notification. Additionally or alternatively, the command may cause the server to store a communication for sending to the user device. For example, an application that is executed by the user device and that is associated with the server may send a request for information from the server (e.g., the application may cause the request to be sent when the application is opened on the user device). The request may cause the application to send the first access code to the server. The server may send the access code received from the user device to the security device. For example, the mobile phone may send the access code received from the smart locker to a server associated with the smart home security system via an application that is trusted by the server. The server may verify that the access code is received from the same user device that was indicated by the device ID received from the security device. For example, the smart home security system may be able to authenticate the user because the access code it sent to the mobile phone matches the access code received from the server. In response to determining that the first access code (e.g., the access code sent to the user device) matches the second access code (e.g., the access code received from the server), the security device may grant access to information and/or items accessible via the security device. For example, the smart home security system may grant access to contents of the smart home and/or information associated with the user's account/user profile associated with the smart home security system.

The computing system 100 may include a security system 102, a user device 104, and/or a server 106. The security system 102 may include a communication subsystem 112 and/or an authentication subsystem 114. The security system 102 may determine that an object has been inserted into a slot of the security device. The object may identify a profile (e.g., an account) associated with the user. The profile may indicate one or more devices that may be used to authenticate the user with the security devices. For example, the security system 102 may be an automated teller machine (ATM) and the object may be a card (e.g., a debit card, a credit card, etc.) that indicates an account of a user. Techniques described herein may allow the ATM to authenticate the user even if the user no longer remembers a PIN number or password associated with the card. The devices indicated in the profile may be devices that the user has previously used to perform actions associated with the user's profile. For example, the devices may have been used for online banking and may have been indicated as trusted devices by the user. The profile may store a list of trusted devices that the user has used (e.g., used more than once).

The security system 102 may generate for display a list of the one or more devices indicated by the account or profile of the user. For example, the security system 102 may display a list of the devices on a screen of the security system 102. The security system 102 may receive a selection of a mobile device from the list of the one or more devices (e.g., via a touch screen of the security system 102). For example, the user may indicate that the user does not remember the user's password associated with the object inserted into the security system 102. In response, the security system 102 may query a database using an identification stored on the object (e.g., stored on a chip on a debit card) to retrieve information associated with the user's account or profile. The information may include a list of one or more trusted devices. The security system 102 may output the list of devices (e.g., on a display screen)

The security system 102 may send an access code to the user device 104. The security system 102 may send the access code to the user device 104 via a peer-to-peer connection or wireless personal area network (WPAN)

established between the security system 102 and the user device 104. For example, the security system 102 may establish a connection with the user device 104 via Bluetooth, Wi-Fi, near field communication (NFC), or any other wired or wireless communication protocol. The security system 102 may use the connection to send the access code to the user device 104. The security system 102 may send the access code to the user device 104 by broadcasting the access code in an environment (e.g., a room in a building, an area outdoors, etc.) surrounding the security system 102. The security system 102 may use a radio frequency or other technique to make sure the broadcast is limited to a threshold distance surrounding the security system 102 (e.g., five feet, 20 feet, etc.). Due to broadcasting the access code, any device within range of the broadcast may be able to receive the access code.

In some embodiments, the security system 102 may determine a location of the user device 104 prior to sending the access code to the user device 104. The security system 102 may determine the location of the user device, for example, as an additional measure to prevent spoofing attacks and/or to otherwise improve security of the security system 102. For example, if the user device 104 is more than a threshold distance away from the security system 102, the security system 102 may determine to not send the access code to the user device 104 and/or deny access to information stored or otherwise accessible via the security system 102. The security system 102 may determine the location of the user device by receiving location information (e.g., global positioning system information) from the user device 104. Additionally or alternatively, the security system 102 may receive a list of service set identifiers (SSID) that the user device 104 is within broadcast range of. The security system 102 may compare the list of one or more SSIDs received from the user device 104 with a list of one or more SSIDs that the security system 102 is able to detect. The security system 102 may determine that the user device is at an approved location, for example, if more than a threshold number/ratio (e.g., more than 5, more than 80%, more than 90%, etc.) of the SSIDs in the list received from the user device 104 match the SSIDs in the list received from the security system 102. The security system 102 may send the access code to the user device 104, for example, if the security system 102 determines that the user device 104 is at an approved location. The security system 102 may lock the account associated with the object (e.g., the object that was inserted into the security system 102 as described above), for example, if the security system 102 determines that the user device 104 is greater than a threshold distance from the security system 102 (e.g., if the security system 102 receives an indication that the user device is greater than a threshold distance from the security device).

In some embodiments the security system 102 may send an encrypted access code to the user device 104. The security system 102 may generate an encryption key (e.g., a unique key, a key that is used to encrypt only one access code before being discarded, etc.) for encrypting the access code. The security system 102 may generate a decryption key that may be used to decrypt information that has been encrypted by the encryption key. For example, the encryption key and decryption key may be a public/private key pair, with the encryption key being the public key and the decryption key being the private key. The security system encrypt the access code before sending the access code to the user device 104 as described above.

The security system 102 may send, to the server 106, an identification of the device that was selected by the user. The server 106 may assist the security system 102 with authenticating the user. For example, the server 106 may be able to communicate with devices indicated in the user profile. For example, the server 106 may communicate with a device via an application that has been installed on a device indicated in the user profile. The application may allow the server 106 and the device to communicate securely and may allow the server 106 to verify that the user is trying to access information at the security system 102. The server 106 may be able to authenticate the user device 104 and indicate the authentication to the security system 102 so that the security system 102 may authenticate the user (e.g., even if the user has forgotten the password or PIN that would otherwise enable the user to access the account). The security system 102 may send the device ID and/or a command to the server 106. The command may cause the server 106 to send a notification to the user device 104. The notification may include a field where the access code that was received, by the user device 104 and from the security system 102, may be entered and sent back to the server 106.

In some embodiments, the security system 102 may send the decryption key (e.g., the decryption key discussed above) to the server 106. For example, the security system 102 may send the decryption key to the server 106, if the security system 102 sent an encrypted access code to the user device 104. The server 106 may send the decryption key to the user device 104 (e.g., via a trusted application installed on the user device 104). The security system 102 may generate a portion of a unique uniform resource locator (URL) for locating the decryption key. The server 106 may store the decryption key at a location indicated by the URL and the user device 104 may download the decryption key using the URL. The user device 104 may use the decryption key to decrypt the encrypted access code. The user device 104 may send the decrypted access code to the security system 102, which may enable the security system 102 to authenticate the user device 104. The security system 102 may verify that the access code is the same access code that was encrypted by the security system 102.

In some embodiments, the user device 104 may send the access code to the server 106. The server 106 may receive the access code and may send the access code to the security system 102. This may enable the security system 102 to verify that the access code received from the server 106 matches the access code that the security system 102 sent (e.g., broadcasted in the environment or sent directly to the user device 104). The server 106 may send a device ID with the access code to the security system 102 (e.g., so that the security system 102 may verify that the access code was received from the same device that was selected by the user as described in more detail above). The security system 102 may wirelessly broadcast a plurality of access codes or the security system 102 may periodically change the access code that is being wirelessly broadcasted. For example, a first code of the plurality of codes may be broadcasted for a predetermined amount of time (e.g., 15 seconds, 30 seconds, 5 minutes, 1 hour, etc.) before a second code of the plurality of codes is broadcasted.

The security system 102 may grant access to information and/or items associated with the security system 102, for example, if the security system 102 verifies that the access code received from the server 106 matches the access code that was sent to the user device. Granting access to information and/or items via the security system 102 may additionally be conditioned on verifying that a device ID received from the server 106 matches the device ID that was selected by the user at the security system 102. The device ID may be indicated in a response sent from the user device 104 to the server 106, for example, when the user device 104 sends the access code to the server 106. The device ID may then be sent from the server 106 to the security system 102 along with the access code that was received, by the server 106, from the user device 104.

Determining that a first access code (e.g., sent to the user device 104) matches a second access code (e.g., received from the server 106) may include determining that a second access code was received by the security system 102 within a threshold amount of time after sending, by the security system 102 (e.g., wirelessly broadcasting), the first access code. The security system 102 may determine to not grant access, for example, if a time between sending the access code to the user device 104 and receiving an access code from the server 106 exceeds a threshold amount of time. By requiring the access code to be received within a threshold amount of time, the security system 102 may prevent spoofing attacks. For example, the time threshold may be such that an attacker is unable to receive the access code at one location (e.g., in the environment surrounding the security system 102), and send it to another device that may be able to send the access code to the server 106. Additionally or alternatively, the security system 102 may deny access to information and/or items, for example, if the access code received from the server 106 does not match the access code output (e.g., via broadcast) from the security system 102.

In some embodiments the security system 102 may receive a request to add a new device to the list of one or more devices. For example, the user may request that a mobile device not present in a list of trusted devices (e.g., devices indicated by information in the user's account) be added to the list. The request may include a device identifier associated with the new device. In response to receiving the request, the security system 102 may send a command to the server 106. The command may include the device identifier associated with the new device. The command may cause the server 106 to send a notification to the new device via an application trusted by the server 106 and the security system 102. In response to receiving an indication that the notification has been interacted with (e.g., by the user), the security system 102 may query the server 106 for an updated list of one or more devices. The newly added device may be used to authenticate the user with the security system 102 as described above.

The security system 102 may communicate with the user device and may cause content that might normally be displayed on a display of the security system 102 to be displayed on the user device 104. For example, the security system 102 may send one or more user interfaces to the user device 104 for display at the user device 104 instead of displaying the user interfaces on a display of the security system 102. This may be done to prevent people that are nearby the security system 102 from viewing content that is intended only for the user of the user device 104 to view. The security system 102 may determine, based on receiving information from one or more devices other than the user device 104 (e.g., by receiving information via near field communication, by detecting radio communication that is being sent from devices, etc.), that multiple users are present in the environment surrounding the security system 102. In response to determining that multiple users are present in the environment surrounding the security system 102, the security system 102 may establish a connection with the user device 104. The security system 102 may transmit or send, via the connection, a graphical user interface (GUI) of the security system 102 to the user device 104 for display on the user device 104. The security system 102 may receive, via the connection with the first device, information indicating user input at the GUI. For example, the user may be able to interact with an ATM using the user's device 104. The user may interact with the ATM via a GUI that is generated by the ATM and sent to the user device 104.

Figure 2:
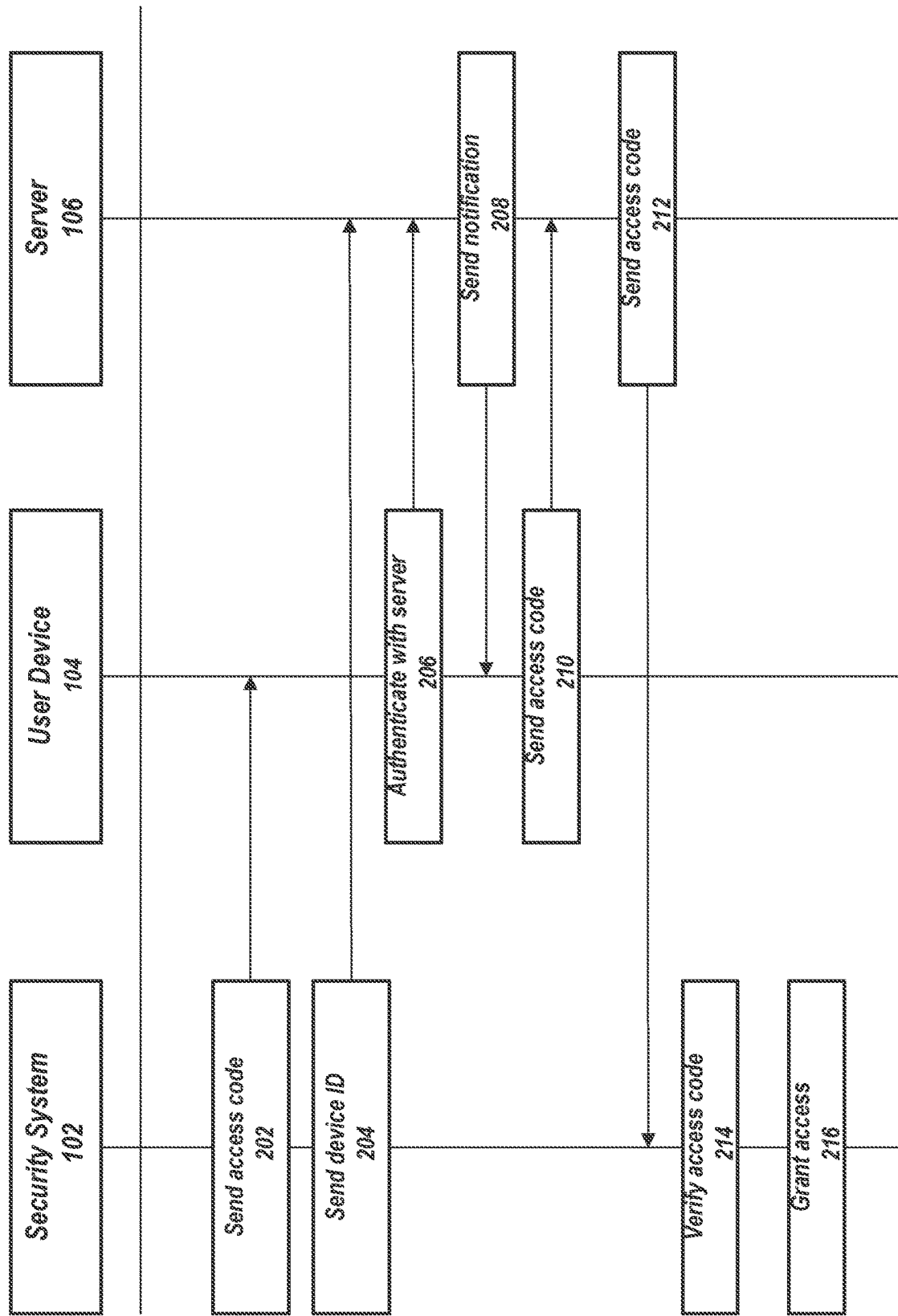
FIG. 2 shows an example flow chart of the actions involved in authenticating a user using an object and a user device, in accordance with some embodiments.

FIG. 2 shows an example flow diagram for authenticating a user. The security system 102 may authenticate a user that has inserted an object (e.g., a card) into the security system 102 by using a trusted device indicated by information stored on the object. At 202, the security system 102 may send an access code to the user device 104 (e.g., via broadcasting to an environment surrounding the security system 102 or via a direct connection with the user device 104). At 204, the security system 102 may send a device ID to the server 106. The device ID may correspond to a selection made by a user at the security system 102 (e.g., via user input received at a touch screen or other input method of the security system 102). For example, a user may select the user's mobile phone by pushing a button on an ATM.

At 206, the user device 104 may authenticate with the server 106. For example, an application on the user device 104 may be used to log in to an account managed by the server 106. At 208, the server 106 may send a notification to the user device 104. For example, a banking server that is associated with the ATM may send a notification via a banking application installed on the user device 104. At 210, the user device 104 may send the access code received at 202 to the server 106. At 212 the server 106 may send the access code to the security system 102. The server 106 may send a device ID (e.g., IP address, MAC address, account number associated with an application installed on the user device 104, etc.) of the user device 104 with the access code. At 214, the security system 102 may verify that the access code matches the access code sent at 202. At 216, in response to verifying the access code in 214, the security system 102 may grant access to contents in the security system 102 and/or information accessible via the security system 102. For example, an ATM may allow a user to perform banking tasks (e.g., withdraw cash, deposit money, transfer money, check account balances, etc.).

Figure 3:
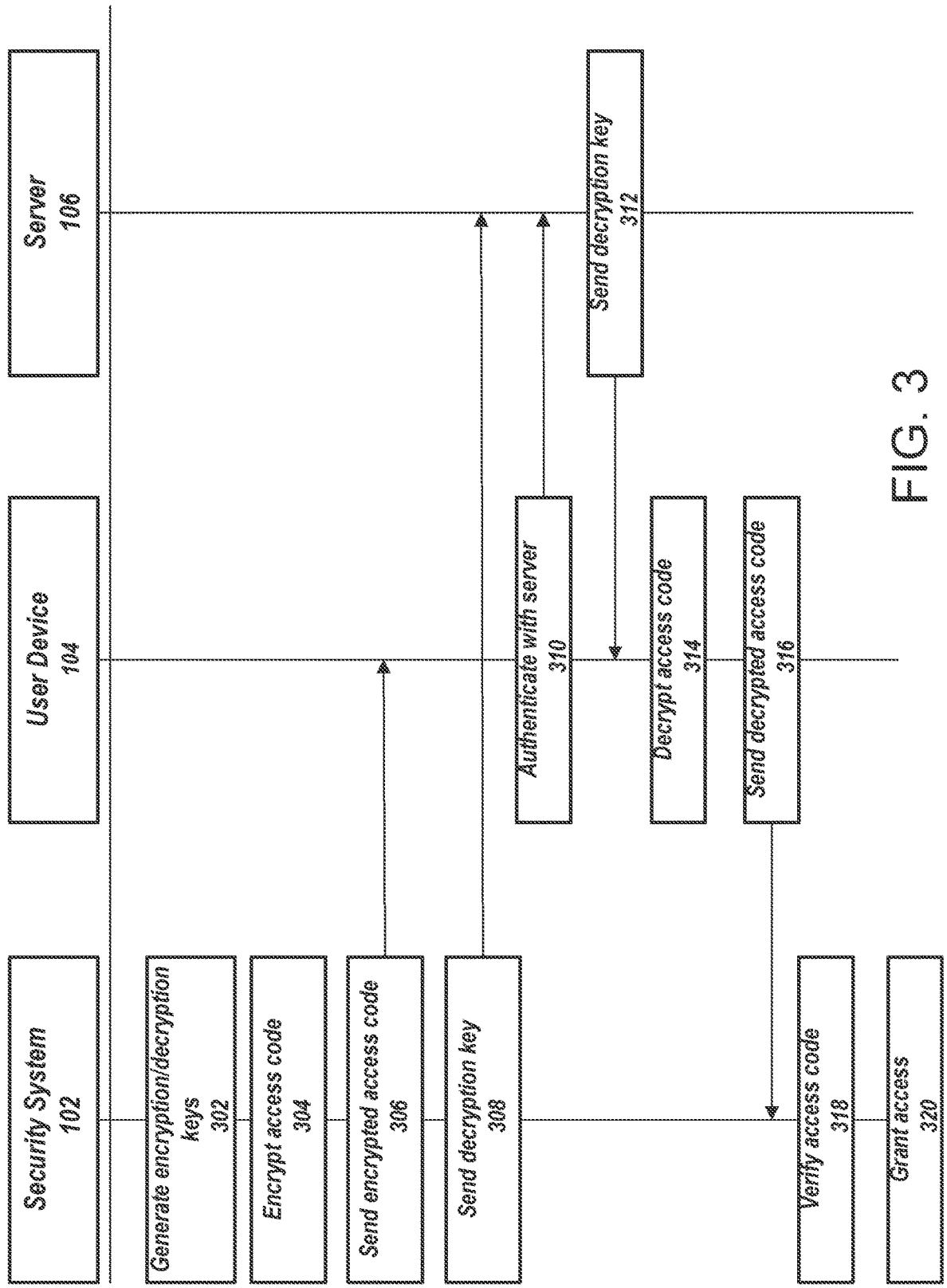
FIG. 3 shows an example flow chart of the action involved in authenticating a user by using an encrypted access code, in accordance with some embodiments.

Referring to FIG. 3, an additional example flow diagram for authenticating a user is shown. The actions shown in FIG. 3 may be performed, for example, if a user requests authentication at the security system 102. For example, the actions shown in FIG. 3 may be performed after a user has requested authentication at the security system 102 by inserting a card into the security system 102 and inputting an indication that the user has forgotten a password or pin number associated with the card. At 302, the security system 102 may generate an encryption key and a decryption key for an access code. At 304, the security system 102 may encrypt the access code, for example, by using the encryption key generated at 302. At 306, the security system may send the encrypted access code to the user device 104. At 308, the security system 102 may send the decryption key to the server 106. The security system may send one or more device IDs to the server 106 along with the decryption key. For example, the one or more device IDs (e.g., IP address and MAC address) may correspond to a device selected by a user at the security system 102 (e.g., as explained in more detail above).

At 310, the user device 104 may authenticate itself with the server 310. For example, the user device 104 may use an application installed on the user device 104 to send credentials of a user to authenticate the user device 104 with the server 106. At 312, the server 106 may send the decryption key, for example, based on receiving the decryption key at 308 and/or based on authenticating the user device 104. The server 106 may verify that the user device 104 corresponds to one or more device IDs received from the security system 102, for example, prior to sending the decryption key to the user device 104.

At 314, the user device 104 may decrypt the access code received from the security system 102 at 306. For example, the user device 104 may decrypt the access code using the decryption key received from the server 106 at 312. At 316, the user device 104 may send the decrypted access code (e.g., via a secure connection such as SSL, Bluetooth, near field communication, etc.) to the security system 102. At 318, the security system 102 may verify the access code received at 316. At 320, the security system 102 may grant access to information and/or items at the security system 102, for example, based on verifying the access code.

Referring to FIG. 1, the user device 104 may be any computing device, including, but not limited to, a laptop computer, a tablet computer, a hand-held computer, smartphone, other computer equipment (e.g., a server or virtual server), including "smart," wireless, wearable, Internet of Things device, and/or mobile devices. The user device 104 may send commands to the security system 102 (e.g., to generate a weighted dataset, to train a machine learning model, etc.). Although only one user device 104 is shown, the system 100 may include any number of client devices.

The security system 102 may include one or more computing devices described above and/or may include any type of mobile terminal, fixed terminal, or other device. For example, the security system 102 may be implemented as a cloud computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the security system 102, those operations may be performed by components of the user device 104, and/or server 106. In some embodiments, the various computers and systems described herein may include one or more computing devices that are programmed to perform the described functions. Additionally or alternatively, multiple users may interact with system 100 and/or one or more components of system 100. For example, a first user and a second user may interact with the security system 102 using two different client devices.

One or more components of the security system 102, user device 104, and/or server 106, may receive content and/or data via input/output (hereinafter "I/O") paths. The one or more components of the security system 102, the user device 104, and/or the server 106 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the security system 102, the user device 104, and/or the server 106 may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to weighting training data (e.g., to increase the efficiency of training and/or performance of one or more machine learning models).

One or more components and/or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a public switched telephone network, a combination of these networks, or other types of communications networks or combinations of communications networks. The devices in FIG. 1 (e.g., security system 102, the user device 104, and/or the server 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, and/or firmware components operating together. For example, the security system 102, any component of the training system (e.g., the communication subsystem 112, the Authentication subsystem 114, etc.), the user device 104, and/or the server 106 may be implemented by one or more computing platforms.

Figure 4:
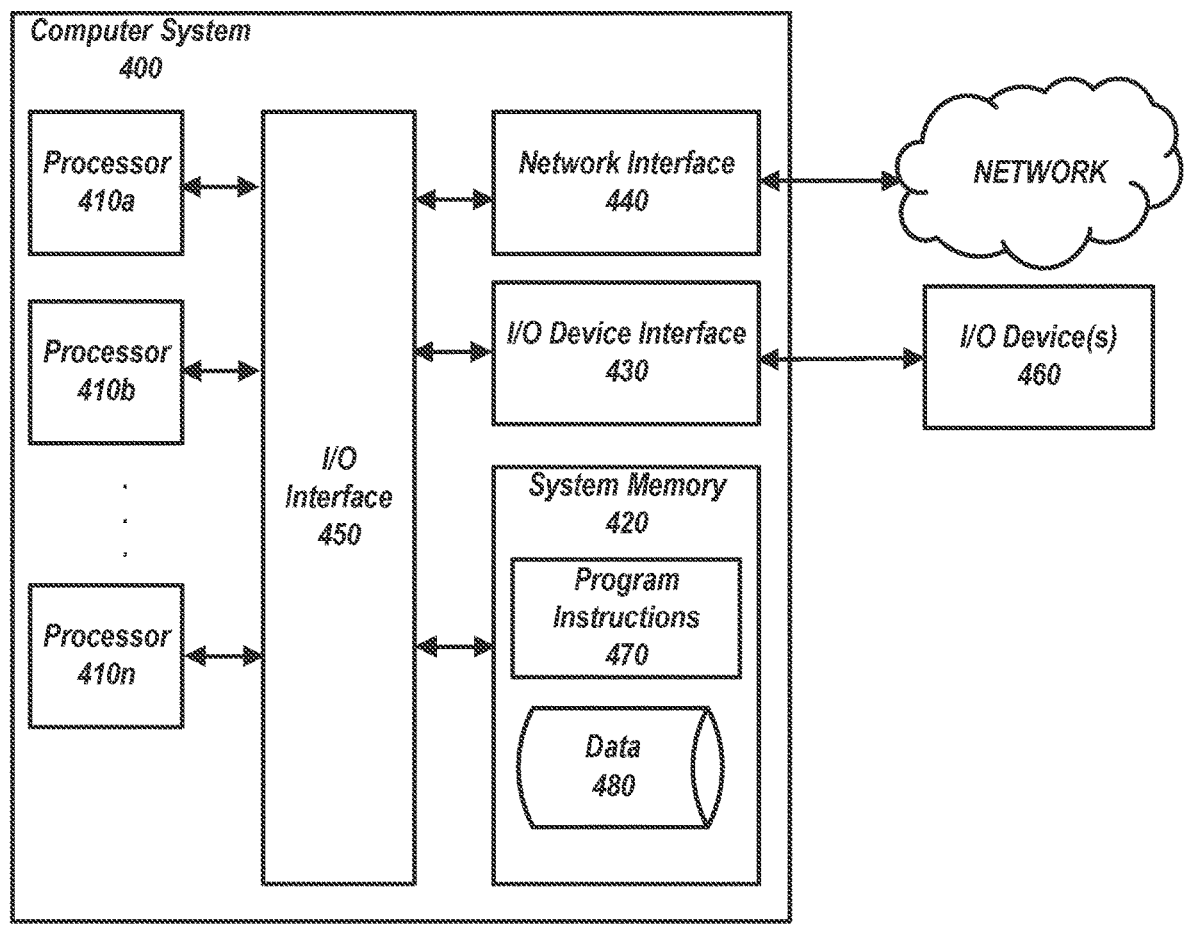
FIG. 4 shows an example computing system that may be used in accordance with some embodiments.

FIG. 4 is a diagram that illustrates an exemplary computing system 400 in accordance with embodiments of the present technique. Various portions of systems and methods described herein, may include or be executed on one or more computer systems similar to computing system 400. Further, processes and modules described herein may be executed by one or more processing systems similar to that of computing system 400.

Computing system 400 may include one or more processors (e.g., processors 410a-410n) coupled to system memory 420, an input/output I/O device interface 430, and a network interface 440 via an input/output (I/O) interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computing system 400 may be a units-processor system including one processor (e.g., processor 410a), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 400 may include a plurality of computing devices (e.g., distributed computer systems) to implement various processing functions.

I/O device interface 430 may provide an interface for connection of one or more I/O devices 460 to computing system 400. I/O devices may include devices that receive input (e.g., from a user) or output information (e.g., to a user). I/O devices 460 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computing system 400 through a wired or wireless connection. I/O devices 460 may be connected to computing system 400 from a remote location. I/O devices 460 located on remote computer system, for example, may be connected to computing system 400 via a network and network interface 440.

Network interface 440 may include a network adapter that provides for connection of computing system 400 to a network. Network interface 440 may facilitate data exchange between computing system 400 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions 470 or data 480. Program instructions 470 may be executable by a processor (e.g., one or more of processors 410a-410n) to implement one or more embodiments of the present techniques. Instructions 470 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 420 may include a non-transitory computer readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices).

I/O interface 450 may be configured to coordinate I/O traffic between processors 410a-410n, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410a-410n). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 400 or multiple computer systems 400 configured to host different portions or instances of embodiments. Multiple computer systems 400 may provide for parallel or sequential processing/execution of one or more portions of the techniques described herein.

Those skilled in the art will appreciate that computing system 400 is merely illustrative and is not intended to limit the scope of the techniques described herein. Computing system 400 may include any combination of devices or software that may perform or otherwise provide for the performance of the techniques described herein. For example, computing system 400 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 400 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 400 may be transmitted to computing system 400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 5:
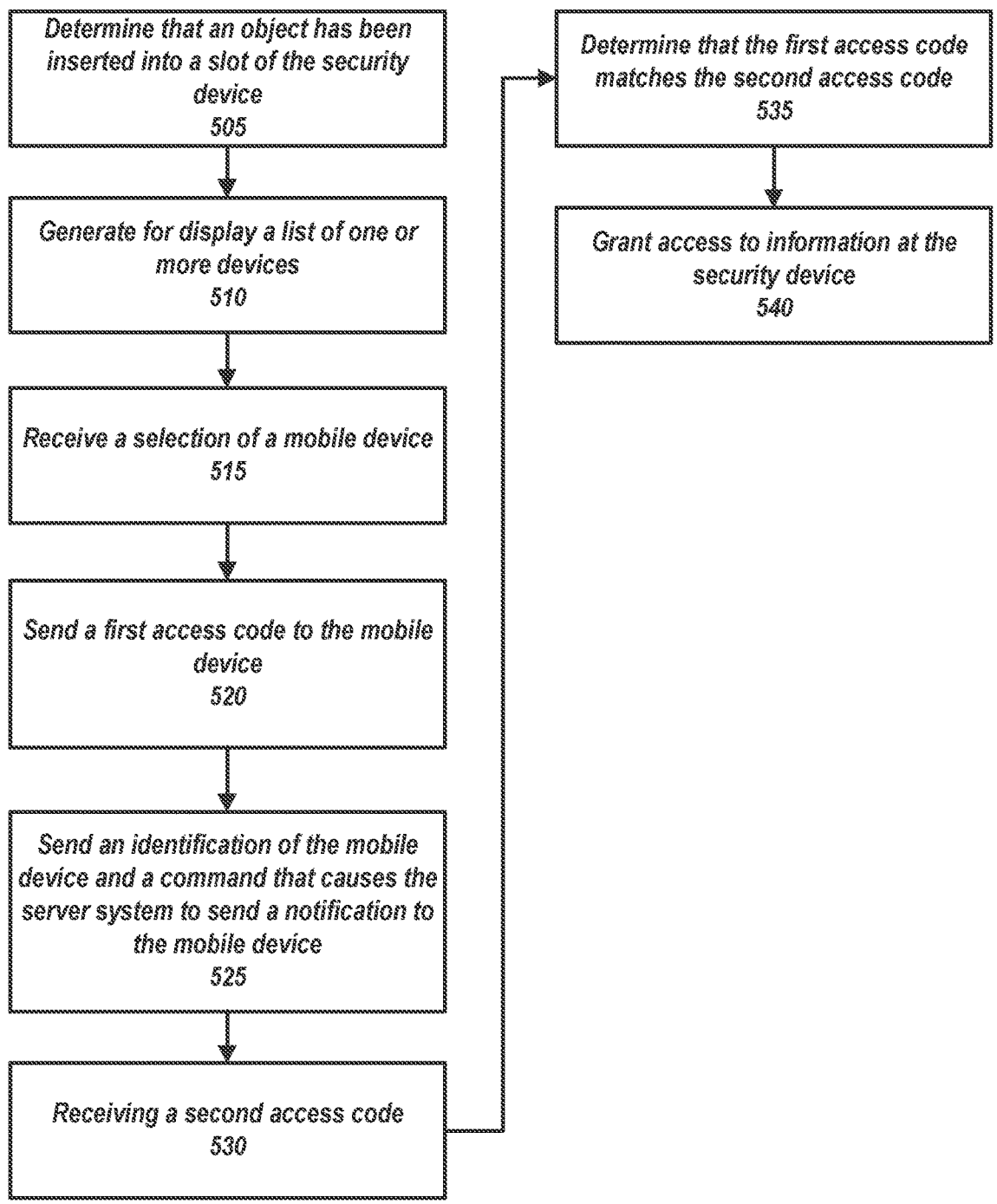
FIG. 5 shows an example flowchart of the actions involved in authenticating a user, in accordance with some embodiments.

FIG. 5 shows an example flowchart of the actions involved in weighting training data for machine learning models. For example, process 500 may represent the actions taken by one or more devices shown in FIGS. 1-4 and described above. At 505, security system 102 (e.g., using one or more components in system 100 (FIG. 1) and/or computing system 400 via I/O interface 450 and/or processors 410a-410n (FIG. 4)) determines that an object has been inserted into a slot of the security system 102. The object may identify a profile associated with a user. The profile may indicate one or more devices that may be used to authenticate the user with the security system 102.

At 510, security system 102 (e.g., using one or more components in system 100 (FIG. 1) and/or computing system 400 via one or more processors 410a-410n and system memory 420 (FIG. 4)) generates for display a list of the one or more devices. At 515, security system 102 (e.g., using one or more components in system 100 (FIG. 1) and/or computing system 400 via one or more processors 410a-410n, I/O interface 450, and/or system memory 420 (FIG. 4)) receives a selection of a mobile device from the list of the one or more devices.

At 520, security system 102 (e.g., using one or more components in system 100 (FIG. 1) and/or computing system 400 via one or more processors 410a-410n (FIG. 4)) sends (e.g., by broadcasting to an environment surrounding the security system 102, by sending via a wireless personal area network (WPAN), etc.), a first access code to the mobile device. The WPAN may include two or more devices within a threshold distance (e.g., 10 centimeters, 1 foot, 3 feet, 10 feet, etc.) of the security device.

At 525, security system 102 (e.g., using one or more components in system 100 (FIG. 1) and/or computing system 400 (FIG. 4)) sends, to a server system, an identification of the mobile device and a command that causes the server system to send a notification to the mobile device. The notification may include a field for entering the first access code.

At 530, security system 102 (e.g., using one or more components in system 100 (FIG. 1) and/or computing system 400 via the network interface 440 (FIG. 4)) receives, from the server system, a second access code. The second access code may have been sent to the server system from the mobile device.

At 535, security system 102 (e.g., using one or more components in system 100 (FIG. 1) and/or computing system 400 via one or more processors 410a-410n (FIG. 4)) determines that the first access code matches the second access code. At 540, security system 102 (e.g., using one or more components in system 100 (FIG. 1) and/or computing system 400 via one or more processors 410a-410n (FIG. 4)), grants access to information that is accessible via the security device, for example, in response to determining that the first access code matches the second access code.

It is contemplated that the actions or descriptions of FIG. 5 may be used with any other embodiment of this disclosure. In addition, the actions and descriptions described in relation to FIG. 5 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or components discussed in relation to FIGS. 1-4 could be used to perform one or more of the actions in FIG. 5.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: determining that an object has been inserted into a security device; wirelessly broadcasting a first access code; sending, to a server, an identification of the first device and a command that causes the server to send a notification to the first device; receiving a second access code; determining that the first access code matches the second access code; and in response to determining that the first access code matches the second access code, granting access to information accessible via the security device.
2. The method of any of the preceding embodiments, wherein transmitting the first access code to the first device comprises: encrypting the first access code prior to transmitting the first access code; generating a unique uniform resource locator (URL) associated with a decryption key for the first access code; and sending the URL with the command to the server.
3. The method of any of the preceding embodiments, wherein wirelessly broadcasting a first access code comprises: generating an encryption key and a decryption key; encrypting the first access code using the encryption key prior to outputting the first access code; sending the encrypted first access code to the first device; sending the decryption key to the server; and receiving the second access code from the first device, wherein the first device receives the decryption key from the server and decrypts the first access code using the decryption key.
4. The method of any of the preceding embodiments, wherein wirelessly broadcasting the first access code comprises: determining, based on receiving information via near field communication protocol from the first device, that the first device is within a threshold distance of the security device; and in response to determining that the first device is within a threshold distance of the security device, outputting the first access code.
5. The method of any of the preceding embodiments, wherein determining that the first access code matches the second access code comprises determining that the second access code was received within a threshold amount of time after wirelessly broadcasting the first access code.

6. The method of any of the preceding embodiments, wherein wirelessly broadcasting a first access code comprises broadcasting a plurality of codes, wherein a first code of the plurality of codes is displayed for a predetermined amount of time before a second code of the plurality of codes is displayed.

7. The method of any of the preceding embodiments, further comprising: receiving an indication that the first device is greater than a threshold distance from the security device; and in response to determining that the first device is greater than a threshold distance from the security device, locking a user account associated with the profile.

8. The method of any of the preceding embodiments, wherein granting access to information accessible via the security device comprises: determining, based on receiving information from multiple devices via near field communication, that multiple users are present in the environment surrounding the security device; in response to determining that multiple users are present in the environment surrounding the security device, establishing a connection with the first device; transmitting, via the connection, a graphical user interface (GUI) of the security device to the first device for display on the first device; and receiving, by the security device and via the connection with the first device, information indicating user input at the GUI.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A security device for authenticating users in physical proximity of the security device, the security device comprising:
one or more processors and computer program instructions that, when executed by the one or more processors, cause operations comprising:
detecting a user interaction with the security device, the user interaction corresponding to a profile associated with a user, the profile indicating one or more devices as potential devices for authenticating the user with the security device;
generating for display, based on the user interaction, a presentation of the one or more devices indicated by the profile associated with the user;
wirelessly broadcasting, based on a first device of the one or more devices being within a threshold distance of the security device, via a wireless personal area network (WPAN), a first access code to an environment surrounding the security device;
sending, to a server system, an identification of the first device and a command that causes the server system to send a notification to the first device; and
in response to receiving a second access code within a threshold amount of time after wirelessly broadcasting the first access code via the WPAN and determining that the first access code matches the second access code, granting access to information accessible via the security device.

2. The security device of claim 1, wherein the WPAN comprises two or more devices within the threshold distance of the security device.

3. The security device of claim 1, wherein wirelessly broadcasting the first access code comprises:
encrypting the first access code prior to wirelessly broadcasting the first access code;
generating a unique uniform resource locator (URL) associated with a decryption key for the first access code; and
sending the URL with the command to the server system.

4. A method comprising:
determining a user interaction with a security device, the user interaction corresponding to a profile associated with a user, the profile indicating one or more devices as potential devices for authenticating the user with the security device;
generating for display, based on the user interaction, a presentation of the one or more devices indicated by the profile associated with the user;
wirelessly broadcasting, based on a first device of the one or more devices being within a threshold distance of the security device, a first access code to an environment surrounding the security device;
sending, to a server system, an identification of the first device and a command that causes the server system to send a notification to the first device;
receiving a second access code within a threshold amount of time via the first device after wirelessly broadcasting the first access code and determining that the first access code matches the second access code; and
in response to receiving the second access code within the threshold amount of time after wirelessly broadcasting the first access code and determining that the first access code matches the second access code, granting access to information accessible via the security device.

5. The method of claim 4, wherein wirelessly broadcasting the first access code comprises:
encrypting the first access code prior to wirelessly broadcasting the first access code;
generating a unique uniform resource locator (URL) associated with a decryption key for the first access code; and
sending the URL with the command to the server system.

6. The method of claim 4, wherein wirelessly broadcasting the first access code comprises:
generating an encryption key and a decryption key;
encrypting the first access code using the encryption key prior to outputting the first access code;
sending the encrypted first access code to the first device;
sending the decryption key to the server system; and
receiving the second access code from the first device, wherein the first device receives the decryption key from the server system and decrypts the first access code using the decryption key.

7. The method of claim 4, further comprising:
receiving information via near field communication protocol from the first device,
wherein determining that the first device is within the threshold distance comprises determining, based on receiving information via near field communication protocol from the first device, that the first device is within the threshold distance of the security device.

8. The method of claim 4, wherein wirelessly broadcasting the first access code comprises switching from wirelessly broadcasting a prior access code to wirelessly broadcasting the first access code after wirelessly broadcasting the prior access code for a predetermined amount of time.

9. The method of claim 4, wherein granting access to information accessible via the security device comprises granting access to information accessible via the security device to the first device.

10. The method of claim 4, wherein granting access to information accessible via the security device comprises granting access to information accessible via the security device to at least one device associated with the user.

11. The method of claim 4, further comprising:
receiving an indication that the first device is greater than the threshold distance from the security device after granting access to information accessible via the security device; and
in response to determining that the first device is greater than the threshold distance from the security device, locking a user account associated with the profile.

12. The method of claim 4, wherein granting access to information accessible via the security device comprises:
determining, based on receiving information from multiple devices via near field communication, that multiple users are present in the environment surrounding the security device;
in response to determining that multiple users are present in the environment surrounding the security device, establishing a connection with the first device;
causing, via the connection, a graphical user interface (GUI) associated with the security device to be presented on the first device; and
receiving, by the security device and via the connection with the first device, information indicating user input at the GUI.

13. One or more non-transitory computer-readable media storing instructions that, when executed by one or more processors, cause operations comprising:
determining a user interaction with a security device, the user interaction corresponding to a profile associated with a user, the profile indicating one or more devices as potential devices for authenticating the user with the security device;
generating for display, based on the user interaction, a presentation of the one or more devices indicated by the profile associated with the user;
wirelessly broadcasting, based on a first device of the one or more devices being within a threshold distance of the security device, a first access code to an environment surrounding the security device;
sending, to a server system, an identification of the first device and a command that causes the server system to send a notification to the first device;
receiving a second access code within a time period related to wirelessly broadcasting the first access code and determining that the first access code matches the second access code; and
in response to receiving the second access code within the time period related to wirelessly broadcasting the first access code and determining that the first access code matches the second access code, granting access to information accessible via the security device.

14. The one or more non-transitory computer-readable media of claim 13, wherein wirelessly broadcasting the first access code comprises:
encrypting the first access code prior to wirelessly broadcasting the first access code;
generating a unique uniform resource locator (URL) associated with a decryption key for the first access code; and
sending the URL with the command to the server system.

15. The one or more non-transitory computer-readable media of claim 13, wherein wirelessly broadcasting the first access code comprises:
generating an encryption key and a decryption key;
encrypting the first access code using the encryption key prior to outputting the first access code;
sending the encrypted first access code to the first device;
sending the decryption key to the server system; and
receiving the second access code from the first device, wherein the first device receives the decryption key from the server system and decrypts the first access code using the decryption key.

16. The one or more non-transitory computer-readable media of claim 13, the operations further comprising:
receiving information via near field communication protocol from the first device, wherein determining that the first device is within the threshold distance comprises determining, based on receiving information via near field communication protocol from the first device, that the first device is within the threshold distance of the security device.

17. The one or more non-transitory computer-readable media of claim 13, wherein wirelessly broadcasting the first access code comprises switching from wirelessly broadcasting a prior access code to wirelessly broadcasting the first access code after wirelessly broadcasting the prior access code for a predetermined amount of time.

18. The one or more non-transitory computer-readable media of claim 13, wherein granting access to information accessible via the security device comprises granting access to information accessible via the security device to the first device.

19. The one or more non-transitory computer-readable media of claim 13, wherein granting access to information accessible via the security device comprises granting access to information accessible via the security device to at least one device associated with the user.

20. The one or more non-transitory computer-readable media of claim 13, the operations further comprising:
receiving an indication that the first device is greater than the threshold distance from the security device after granting access to information accessible via the security device; and
in response to determining that the first device is greater than the threshold distance from the security device, locking a user account associated with the profile.

* * * * *